United States Patent [19]

Graham, Jr.

[11] Patent Number: 4,630,215

[45] Date of Patent: Dec. 16, 1986

[54] MACHINE TOOL TRACER ASSEMBLY AND CONTROL SYSTEM

[76] Inventor: Merrill E. Graham, Jr., P.O. Box 545, Tehachapi, Calif. 93561

[21] Appl. No.: 547,375

[22] Filed: Oct. 31, 1983

[51] Int. Cl.$^4$ .............................................. G05B 19/00
[52] U.S. Cl. ..................................... 364/474; 364/167; 364/170; 318/578; 307/236; 307/354
[58] Field of Search ....................... 364/474, 167, 170; 318/578, 626; 307/350, 351, 354, 236; 328/147

[56] References Cited

U.S. PATENT DOCUMENTS

| | | | |
|---|---|---|---|
| 2,511,956 | 6/1950 | Wetzal | 318/578 |
| 2,559,575 | 7/1951 | Fryklund | 318/578 |
| 2,868,087 | 1/1959 | Morgan | 364/474 |
| 3,454,853 | 7/1968 | Hawkins et al. | 318/578 |
| 3,467,899 | 9/1969 | Inaba et al. | 318/578 |
| 3,568,029 | 3/1971 | Bollinger | 318/578 |
| 3,714,537 | 1/1973 | Bur | 318/626 |
| 4,044,289 | 8/1977 | Wenzel | 318/578 |
| 4,084,244 | 4/1978 | Floter | 364/474 |
| 4,170,850 | 10/1979 | Horvath | 318/578 |
| 4,224,670 | 9/1980 | Yamazaki | 364/474 |
| 4,467,432 | 8/1984 | Imazeki et al. | 318/578 |

Primary Examiner—Joseph Ruggiero
Assistant Examiner—Allen MacDonald
Attorney, Agent, or Firm—Robert R. Mallinckrodt

[57] ABSTRACT

A tracing stylus assembly for controlling operation of an electrically controlled machine tool produces analog electrical signals which are representative of displacement of a stylus member from a center rest position in any direction in at least two transverse planes which correspond to planes of movement available in the machine tool during machining operations. The electrical signals from the tracing stylus are connected to standard motor control amplifiers in the machine tool to control movement of the machine tool. The electrical signals from the stylus may be easily processed to provide adjustments to operation not otherwise possible. For example, the null point of the stylus member can be adjusted electronically as can the correlation between the amount of travel of the stylus and the rate of response of the machine tool. A computer operated machine can be easily programmed using the stylus assembly of the invention, and the stylus assembly can be used as a fail-safe device to automatically halt operations of the machine when under automatic computer control if the control or computer malfunctions so that the machine tool starts to move in a manner that would ruin a part being machined.

21 Claims, 9 Drawing Figures

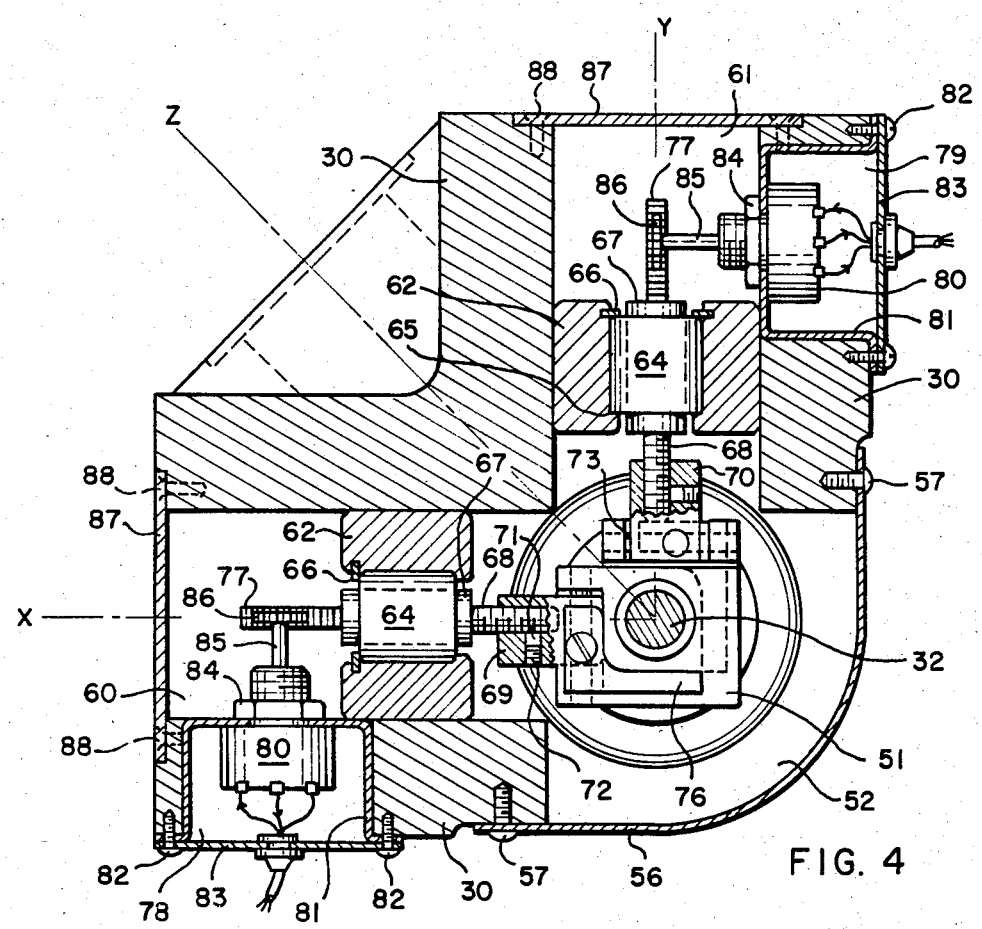
FIG. 4
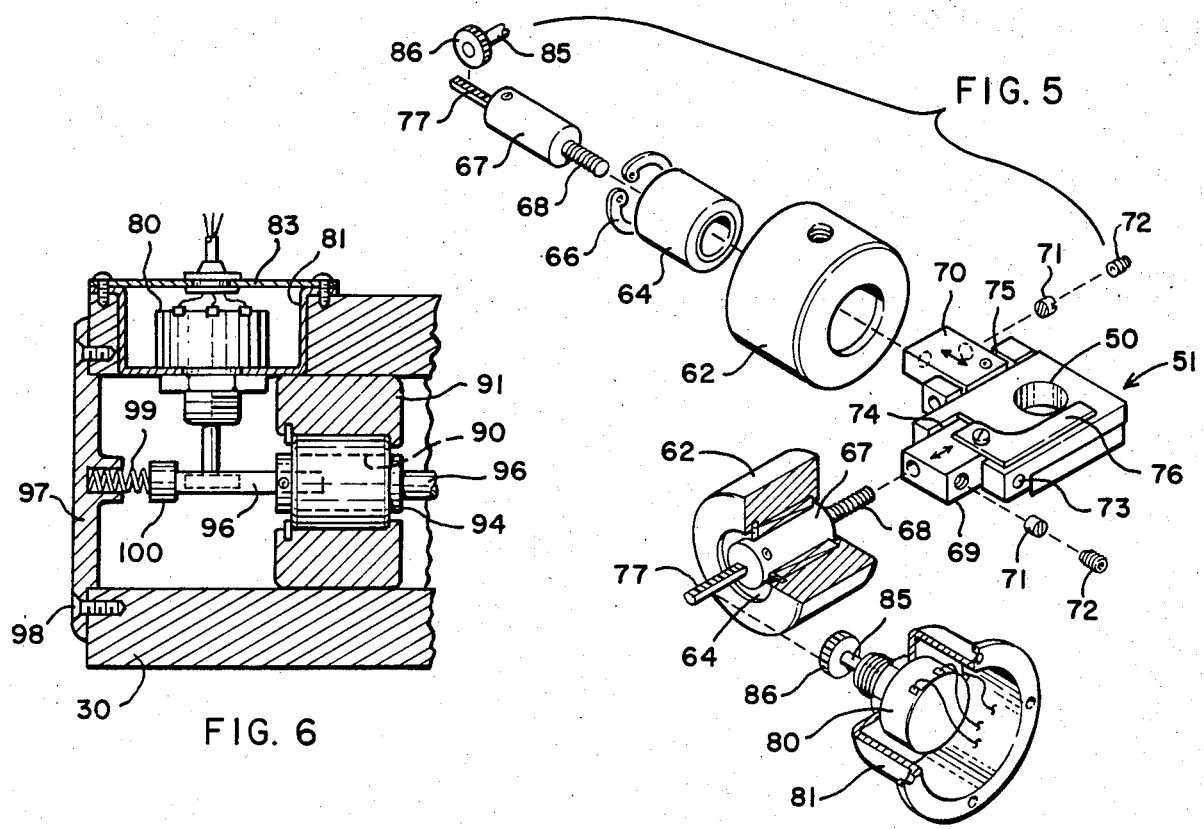
FIG. 5
FIG. 6

MACHINE TOOL TRACER ASSEMBLY AND CONTROL SYSTEM

BACKGROUND OF THE INVENTION

Field: The invention is in the field of machine tools, particularly machine tools which utilize a tracer stylus or machine tools which utilize electronic control.

State of the Art: Profiling machine tools which utilize a tracer stylus are well known. An operator positions a pattern, which is an actual part, prototype of a part, or mock-up of a part, adjacent to the stylus and then uses the stylus by holding it against such pattern manipulating it in such a way to cause the feed table and milling spindle of the machine to move and mill from raw material a new part that is an exact copy of the pattern. Current tracer stylus systems utilize hydraulic control of the milling machines and the tracer styluses are expensive, precision hydraulic instruments using hydraulic spooler valves in the stylus assembly to control the hydraulic valves which operate the hydraulic rams to position the feed table and milling spindle. Each of these hydraulic stylus assemblies cost between $17,000 and $20,000 and require a very experienced operator to make the necessary mechanical adjustments and to satisfactorily operate the system, particularly in connection with making complex parts. Further, such hydraulic stylus assemblies are usable only with hydraulically operated machine tools, and not with the newer electrically operated tools.

Most of the newer machine tools are computer controlled so that when the computer is properly programmed, the tool automatically mills the desired part. However, in most cases the time and cost of developing a program for a particular part can be substantial. While such automatic operation is beneficial for a large run of parts where the programming cost can be spread over the large number of parts made, the programming costs become prohibitive when a limited run is necessary or a single replacement part is made.

In addition, in such computer-controlled systems, the movement of the spindle and raw material is generally done electrically rather than hydraulically, although some hybrid systems are available which provide electrical control of the hydraulic systems.

There is one computer-controlled milling machine currently on the market, made by Getty Machine Tool Division of Getty Oil, which incorproates a tracing stylus. With this machine, the stylus is connected directly to the computer of the control system and operates through the computer. The stylus is compatible only with the companion computer-controlled equipment and cannot be used with other equipment.

There is a need for a simple tracing stylus which produces electrical rather than hydraulic control signals so as to be compatible with electrically driven machine tools or electrically controlled, hydraulically driven machine tools, and which operates such tools directly, rather than through a computer system. With such operation, the tracing units would be compatible with a large number of existing machine tools whether or not computer controlled, and if computer controlled, the tools would not be dependent on the computer and could be operated even when the computer is shut down or is being repaired. Further, it would be advantageous to be able to use a stylus arrangement to trace a pattern and to program an associated computer through such tracing operation. In addition, a tracing stylus is needed that is simple to operate and adjust, with practically any operator being able to satisfactorily operate the machine tool, rather than requiring a highly experienced operator.

SUMMARY OF THE INVENTION

According to the invention, a tracing stylus assembly produces electrical output signals that are connected directly to the standard motor drive amplifiers of a machine tool to provide direct electronic control of the machine tool by the stylus. The signals from the stylus are not fed into or through a computer so the machine tool is operative even if the computer goes down. Further, the stylus can be used with machine tools that do not have a computer, and can be used with any machine tool having motor drive amplifiers used either for actual movement of the feed table and milling spindle, or for control of such movement.

The tracing stylus assembly of the invention is used in combination with a machine tool having an implement holding spindle for holding a milling implement and a feed stable for securement of the raw material to be machined. The feed table is mounted on the machine for back and forth movement in one plane while the spindle is mounted on the machine for back and forth movement relative to the feed table in at least a second plane transverse to the first plane, and usually in a third transverse plane also. Thus, relative movement of the milling implement and raw materials are obtained in at least two transverse planes and usually three transverse planes representing movement in the X, Y, and Z axes as usually referred to in a Cartesian coordinate system. Movement of the feed table and the spindle in each plane is either actually accomplished by, or controlled by, an electric motor which in turn is controlled by a motor drive amplifier. Each motor drive amplifier is controlled by an analog control signal, generalloy a voltage signal between +10 and −10 volts.

The tracing stylus assembly of the invention includes a stylus member, one end of which is adapted to be held by a user and manipulated to trace a pattern. The stylus member may be moved in the same directions that the feed table and spindle move. Means are provided for converting the movement of the stylus member in each plane of movement into an electrical representative of the amount and direction of movement of the stylus in each plane. The electrical signals generated for each plane of movement may be connected directly to the motor drive amplifiers controlling the motors to cause movement of the machine tool, or the signals may be passed through control circuitry where certain adjustments to the signals may be made by the user prior to the signals being fed to the motor drive amplifiers. Such adjustments adjust operation of the machine.

In order for the stylus to generate the analog signals required to control the motor control amplifier, the stylus may be operably coupled to a separate potentiometer for each plane of movement so that movement of the stylus in a plane results in movement of the associated potentiometer. With +15 and −15 volts connected across the potentiometer and the wiper contact of the potentiometer set to give an output of zero volts in its normal position, any movement of the potentiometer causes an output voltage to appear on the wiper of the potentiometer. The polarity of the signal indicates direction of movement while magnitude of the signal indicates amount of movement.

With an analog signal from the tracer stylus assembly as described, the signal may be processed to electronically shift the null point of the stylus in a particular plane and to electronically adjust the correlation between the amount of travel and the amplitude of the output signal. With the latter adjustment, the rate of response of the machine for a particular displacement of the stylus may be accurately adjusted so that it is the same for each plane. With hydraulic tracer systems, such adjustments require careful mechanical adjustment of the stylus. Further, with the control as indicated, the user can easily generate signals manually without the stylus to control certain operations of the machine and the overall rate of movement of the machine can be independently controlled.

A further feature of the invention is that it can be used with normal computer controlled machine tools as a fail-safe device to automatically stop operation of the machine if something goes wrong with the computer control and movement of the machine is such that damage to a part being machined would result.

THE DRAWINGS

In the accompanying drawings, which illustrate the best mode currently contemplated for carrying out the invention in actual practice:

FIG. 1 is a pictorial view of a standard machine tool fitted with a tracer stylus assembly of the invention and a control panel of the invention;

FIG. 2, a perspective view of the tracer stylus assembly alone;

FIG. 3, a vertical section of the tracer stylus assembly taken on the line 3—3 of FIG. 2;

FIG. 4, a horizontal section taken on the line 4—4 of FIG. 3;

FIG. 5, an assembly view of the internal parts shown in FIG. 4;

FIG. 6, a fragmentary horizontal section taken on the line 6—6 of FIG. 3;

FIG. 7, a block diagram showing the connection of the control system of the invention to the general control system of the machine tool;

FIG. 8, a circuit diagram showing schematically the control circuitry of the invention; and FIG. 9, a vertical elevation showing a control panel of the invention.

DETAILED DESCRIPTION OF THE ILLUSTRATED EMBODIMENT

Figure 1:
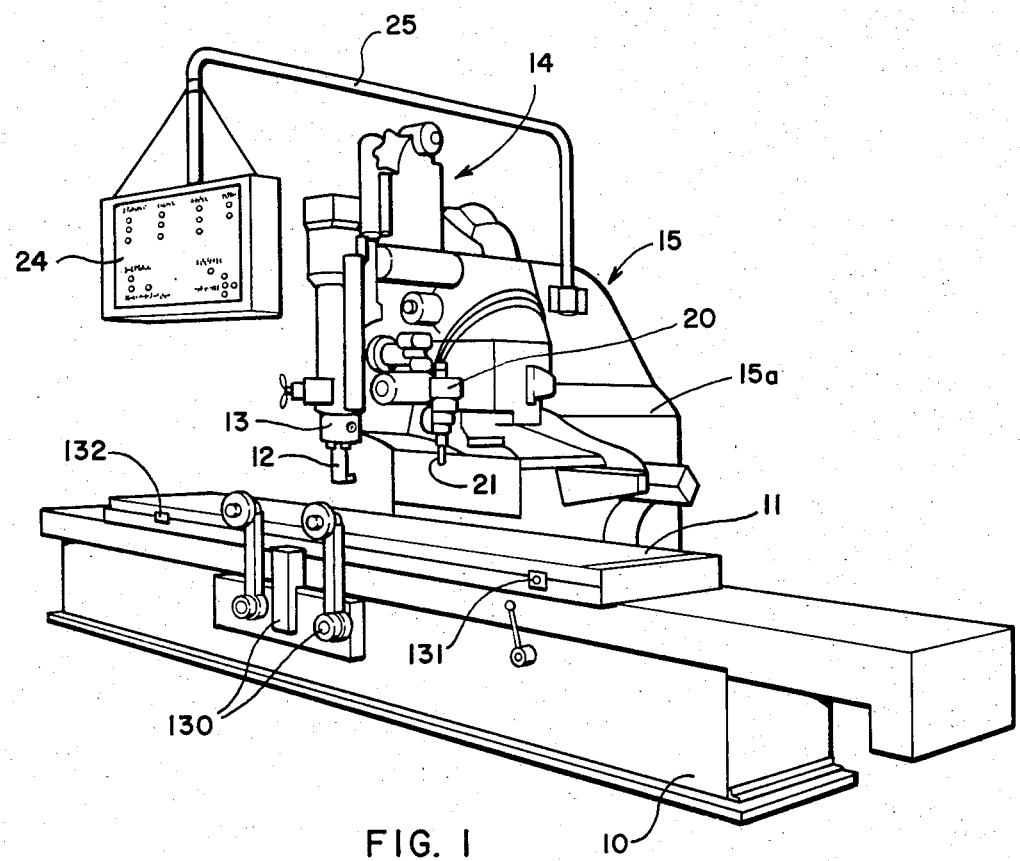

FIG. 1 is a generalized representation of a normal machine tool with which the current invention may be used, such as a Hydro-Tel milling machine made by the Cincinnati Machine Tool Company of Cincinnati, OH. Machine tools of this type are well known and FIG. 1 does not attempt a detailed showing of the machine. The machine tool has a base 10 on which a work feed table 11 is mounted for movement in one plane along the base. Thus, feed table 11 can move either to the left or right along the base. When related to a cartesian coordinate system this is generally considered as movement along the X axis. A milling implement 12 is mounted in chuck 13, which is mounted on a shaft adapted to be rotated so as to form an implement-holding spindle. The spindle is mounted in a support housing indicated generally as 14, which, in turn, is mounted on an additional support housing indicated generally as 15. Housing 15 is adapted for forward and rearward movement with respect to base 10, such as along the interface at 15a, so as to move the spindle and implement forwardly and rearwardly with respect to tool base 10 and feed table 11. Such movement of housing 15 is in a plane transverse to the movement of feed table 11 and is generally considered as movement along the Y axis. In most machine tools, support housing 14 will be mounted on support housing 15 in such manner that housing 14 can move up and down with respect to housing 15, and thus, with respect to base 10 and feed table 11. This is movement in a third plane transverse to the other two planes and is generally considered as movement along the Z axis.

In use, material to be machined is secured to the feed table 11 adjacent tool 12. Between the movement of feed table 11 and the movement of the spindle, relative movement between the tool and material to be worked can be obtained in all three dimensions.

The tool shown is equipped with a tracer assembly 20, secured to housing 14, and having a tracer stylus 21 extending therefrom. The tracer assembly is used to trace, or copy, patterns. A pattern is secured to feed table 11 so that it is located similarly with respect to stylus 21 as the raw material to be machined is located with respect to implement 12. Since the tracer assembly is secured to housing 14, it will move as the spindle and implement 12 move. The operator then operates the machine by moving the stylus. Moving the stylus from its center rest, or neutral, position will cause relative movement of the material and tool in the direction that the stylus is moved. The amount of movement of the stylus, i.e. the displacement of the stylus in any direction from its center rest position, generally controls the speed of movement. Thus, if an operator facing the machine moves the stylus toward him, housing 15 will move toward him causing both implement 12 and stylus 21 to move toward him. If he moves stylus 21 away from him, toward the back of the machine, housing 15 will move back causing implement 12 and stylus 21 to move away from him. Similarly, movement of stylus 21 upwardly or downwardly causes movement of housing 14, implement 12, and stylus 21, upwardly or downwardly, respectively. If the operator moves the stylus to the left, indicating that the implement and stylus should be moved to the left relative to the material being machined and the pattern, respectively, feed table 11 will move to the right. This effectively moves the implement to the left with respect to the material being machined and the stylus to the left with respect to the pattern. If the operator moves the stylus to the right, the feed table 11 moves to the left, thereby effectively moving the implement to the right with respect to the material being machined and the stylus to the right with respect to the pattern. Once the operator has brought the stylus into contact with the pattern, he moves the stylus along the pattern so as to trace it, thereby machining a new part that is an exact copy of the pattern. This operation of the tracing stylus is the same whether prior art hydraulic tracing units are used, or whether the tracing unit of the current invention is used. With the tracing unit of the current invention, in addition to the tracing unit, a control panel 24 is provided so that the operator can control some operations of the machine and can make adjustments to the stylus operation from the control panel. The panel is suspended from arm 25 pivotally secured to housing 15 and can be swung into a position where an operator can easily operate the stylus and simultaneously have access to the control panel.

The actual tracing assembly of the invention can take many forms, but the preferred form is as shown in FIGS. 2-6. From an outward appearance and stylus movement standpoint, the preferred tracer assembly is identical to the currently used Rosebrook Series 3000 hydraulic tracer unit available from Rosebrook in Los Angeles, Calif. This is preferred because operators are familar and comfortable with the appearance and operation of the Rosebrook unit so could easily use the unit of the invention.

As with the Rosebrook tracer assembly, the assembly of the invention comprises a housing 30 having a vertical bore 31 in which stylus member 32 is positioned. Stylus member 32 has an enlarged ball portion 33 which seats against a similarly configured receiving shoulder 34 in sleeve 35. A retaining ring 36 is held in place by sleeve 37 threaded into sleeve 35. Sleeve 35 is slidably mounted in an outer sleeve 38 secured in bore 31 which fits between sleeve 35 and the wall of bore 31. Sleeves 35 and 37 both provide clearance for stylus 32 so that stylus 32 can pivot in all directions on ball portion 33.

Stylus 32, with sleeves 35 and 37, are biased to a vertical equilibrium or null point by spring 39 acting upwardly against ring 39a seated against shoulder 40 of sleeve 35 and held in place by cap 41 threaded into bore 31, and by spring 42 acting downwardly on stylus 32 through pins 43 and 44 and ball 45. Ball 45 is held against lateral movement by sleeve 46. Spring 42, pins 43 and 44, ball 45 and centering ring 47, all cooperate to provide a centering mechanism for stylus 32 to bias the stylus to a center or null point after the lower end thereof has been displaced and then released by an operator.

An upper intermediate portion 49 of stylus member 32 passes through hole 50 in yoke plate assembly 51, which is located in a recess 52 of housing 30. Thus, as the lower end of stylus 32 is moved and pivots about ball portion 45, the upper end of the stylus moves in a direction opposite the direction of movement of the lower end and causes movement of yoke plate assembly 51. The amount of movement of the stylus allowed in the lateral direction is controlled by adjustment of the rate control assembly indicated generally at 53 and the amount of vertical movement of the stylus is controlled by adjustment of the rate control assembly indicated generally at 54. A stylus bias assembly by which the stylus can be biased to a displaced position in any direction is indicated generally at 55. A cover 56 for recess 52 is held in place by screws 57. Everything described so far is the standard construction of the Rosebrook assembly.

In the standard Rosebrook assembly, hydraulic spooler valves are provided to convert movement of the stylus member 32 into hydraulic fluid flow to operate the hydraulic rams that position the feed table 11 and housings 14 and 15. With the present invention, means for converting movement of the stylus into electrical signals are used rather than the hydraulic spooler valves. In the currently preferred embodiment of the invention, these means for generating electrical signals are located within the assembly in substantially the same location that the hydraulic spooler valves are located in the standard Rosebrook assembly. Thus, bores 60 and 61 extend through assembly housing 30 at right angles to one another and are aligned, respectively, with two adjacent edges of yoke plate assembly 51. Such bores would normally house hydraulic spooler values. With the invention, a mounting collar 62 is secured in each of the bores 60 and 61, respectively, by set screws 63.

Linear bearings 64, such as made by the Barden Corporation of Danbury, Conn., are mounted in collars 62 and are held in place against shoulders 65 by snap rings 66. Shafts 67 are mounted for longitudinal movement in bearings 64. Threaded rods 68 are secured to shafts 67 and to respective connecting blocks 69 and 70 by half-nut pins 71 and set screws 72. Connecting blocks 69 and 70 are secured to yoke plate assembly 51 by pins 73. Connecting blocks 60 and 70 are narrower than the receiving opening 74 and 75, respectively, in yoke plate assembly 51 so that the movement of yoke plate assembly 51 in a direction perpendicular to a shaft 67 is taken up by the extra space as either connecting block 69 or 70 slides on its pin 72. Movement of yoke plate assembly 51 in a direction in line with a shaft 67 causes similar movement of shaft 67 in bearing 64. Plate 76 is a leveling plate and a standard part of the Rosebrook unit as are connecting blocks 69 and 70, threaded rods 68, and the entire yoke plate assembly 51. Attached to the other ends of shafts 67 are gear racks 77.

Tracer assembly housing 30 also contains respective bores 78 and 79 which intersect bores 60 and 61, respectively, at right angles. Potentiometers 80 are mounted on mounting brackets 81 secured to valve body 30 by screws 82. Screws 82 also hold covers 83 in place. Potentiometers 80 are secured to brackets 81 by nuts 84. Potentiometer shafts 85 extend over racks 77 in bores 60 and 61 so that gears 86 mounted on shafts 85 engage respective racks. The ends of bores 60 and 61 are closed by covers 87 held in place by screws 88. With the structure described, if the stylus 32 is moved so as to cause yoke plate assembly 51 to move in the direction of a shaft 67, that shaft 67 will move causing associated rack 77 to move, which, in turn, rotates associated gear 86 and shaft 85 of a potentiometer 80. Any movement of stylus 32 in a lateral direction will cause movement of one or the other or both of shafts 67 and racks 77, and, in turn, cause a change in the settings of one or the other or both potentiometers 80.

Figures 2, 3:
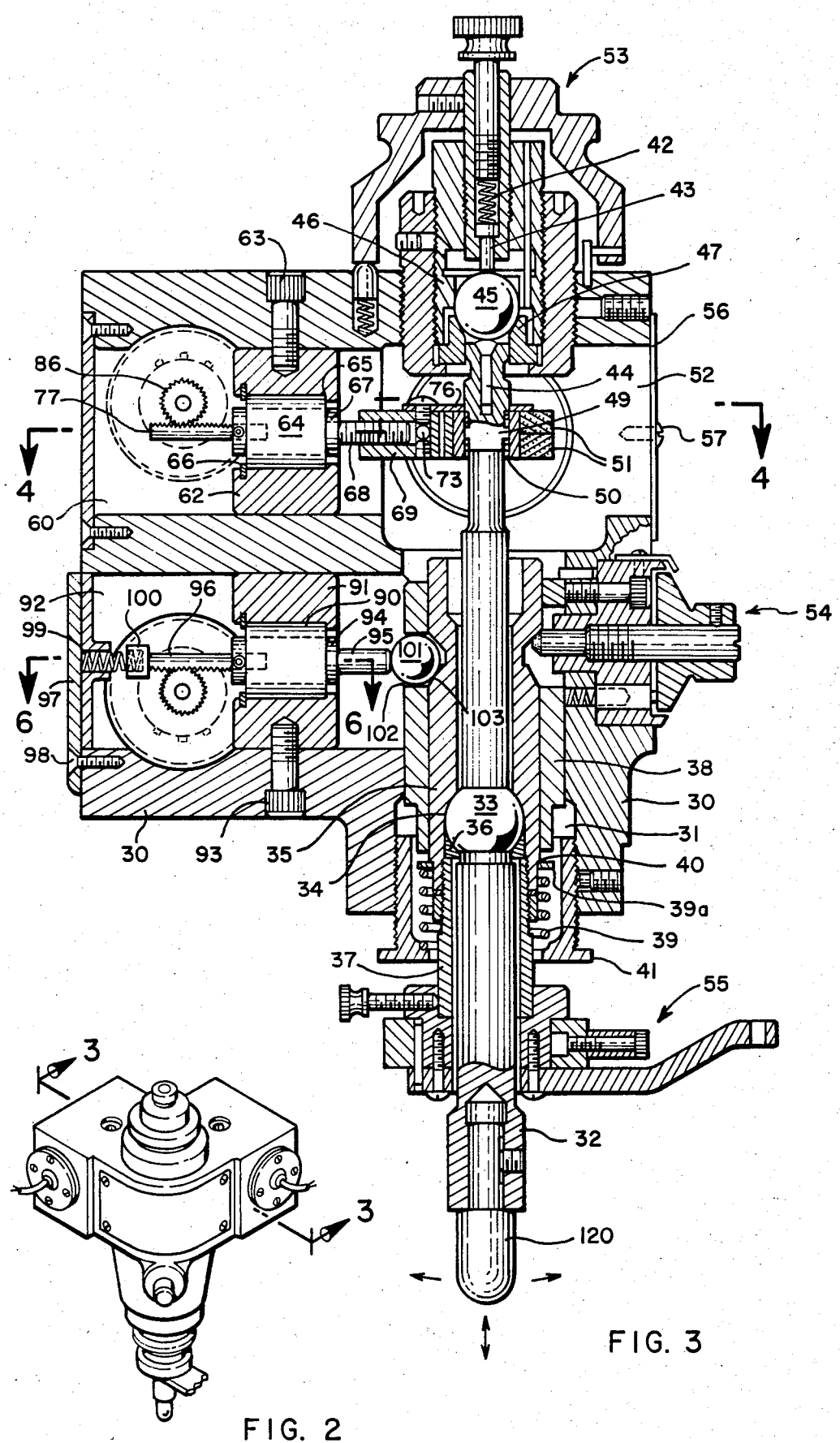

To measure vertical movement of stylus 32, a similar potentiometer arrangement is used. In this case, a linear bearing 90, FIGS. 3 and 6, is mounted in collar 91 which is secured in bore 92 of assembly housing 30 by screw 93. A shaft 94 extends through bearing 90 with a pin 95 secured to one end thereof and a rack 96 secured to the other. A cap 97 for bore 92 is held in place by screw 98 and provides a receiving hole for spring 99 which acts against the end of rack 96 through spring receiving pocket 100. Spring 99 thus biases shaft 94 and pin 95 in a direction toward ball 101 located in bore 102 of sleeve 38. Ball 101 rests against inclined surface 103 cut into sleeve 35. Thus, as stylus 32 and sleeve 35 move upwardly, ball 101 is forced outwardly by surface 103 and causes outward movement of rack 96. When stylus 32 and sleeve 35 move downwardly, ball 101, which is biased inwardly through the action of spring 99 and pin 95, moves inwardly along surface 103, causing inward movement of rack 96. A potentiometer 104 is mounted by nut 105 to mounting bracket 106 which is secured to housing 30 by screws 107. Cover 108 is also held in place by screws 107. A gear 109, mounted on potentiometer shaft 110, meshes with rack 96 so that when rack 96 moves, gear 109 rotates, rotating potentiometer shaft 110, thereby changing the setting of potentiometer 104. It is preferred that all racks and mating gears used in the tracer assembly be fine-toothed, such as 120 pitch round stock racks and mating 120 pitch gears available from PIC in Van Nuys, Calif.

Figure 7:
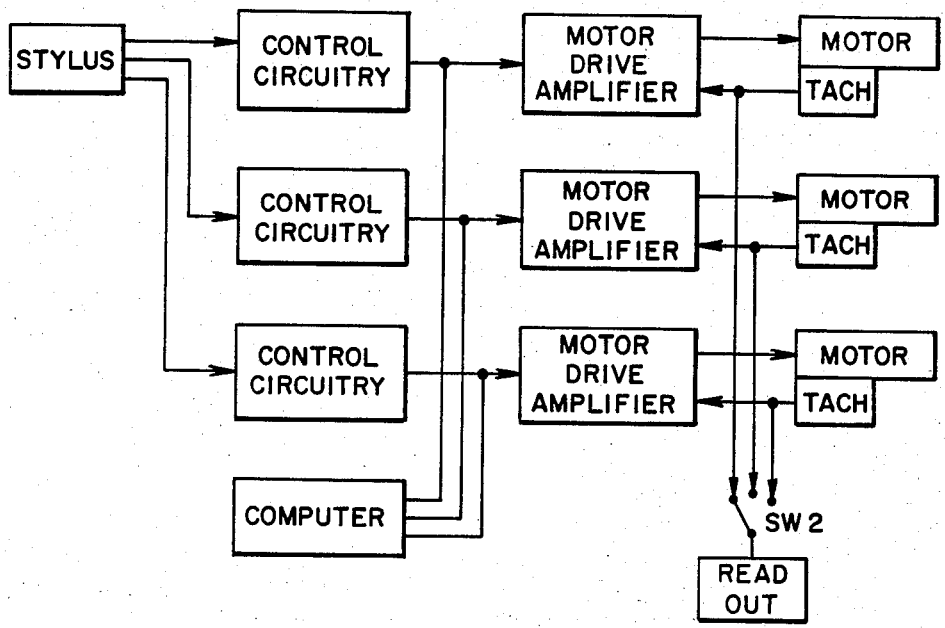

FIG. 7 shows a block diagram of the control system of a normal machine tool having electrical control and incorporating the control system of the present invention. In electrically operated machine tools, movement of the feed table 11 and of the housings 14 and 15 is accomplished by screw drives attached to respective electric motors. In hydraulically operated machine tools, electrically controlled operation can be obtained by operating hydraulic spooler control valves by electric motors. In such case, the spooler valves then control operation of the hydraulic rams that actually move the feed table and the housings. In either case, however, the motors are controlled by motor drive amplifiers. These motor drive amplifiers all operate similarly and require an analog input control signal ranging between +10 and −10 volts. One popular motor drive amplifier of this type is the linear motor drive amplifier made by West-Amp in Santa Monica, Calif. In a machine tool having three axes of relative movement, i.e., feed table 11, housing 15, and housing 14, three separate motors are required. One motor operates the side-to-side movement of the feed table, one operates the forward and rearward movement of housing 15, and one operates the up and down movement of housing 14. A separate motor drive amplifier is required for each motor. These amplifiers are connected to the motors in standard fashion so that the required driving voltage and current for a motor is controlled by the amplifier. This control is accomplished by the control signal sent to the motor drive amplifier. A tachometer is provided for each motor and is connected to the motor drive amplifier in normal manner to supply feedback signals to the associated amplifier indicating motor response to the driving voltage and current applied by the amplifier to the motor. With computer control, a computer supplies a separate signal to each motor control amplifier to control operation of the machine.

With the present invention, as shown in FIG. 7, the three signals from the stylus, each signal representing stylus movement in a different plane, pass through separate control circuits and are then fed to separate motor drive amplifiers, which, in turn, through separate motors, control relative movement of the milling implement and material to be machined. While the signals from the stylus could be connected directly to the motor control amplifiers and would provide good machine control, the use of electrical control signal from the stylus presents the opportunity to provide additional operator flexibility through processing of the signals.

Figure 8:
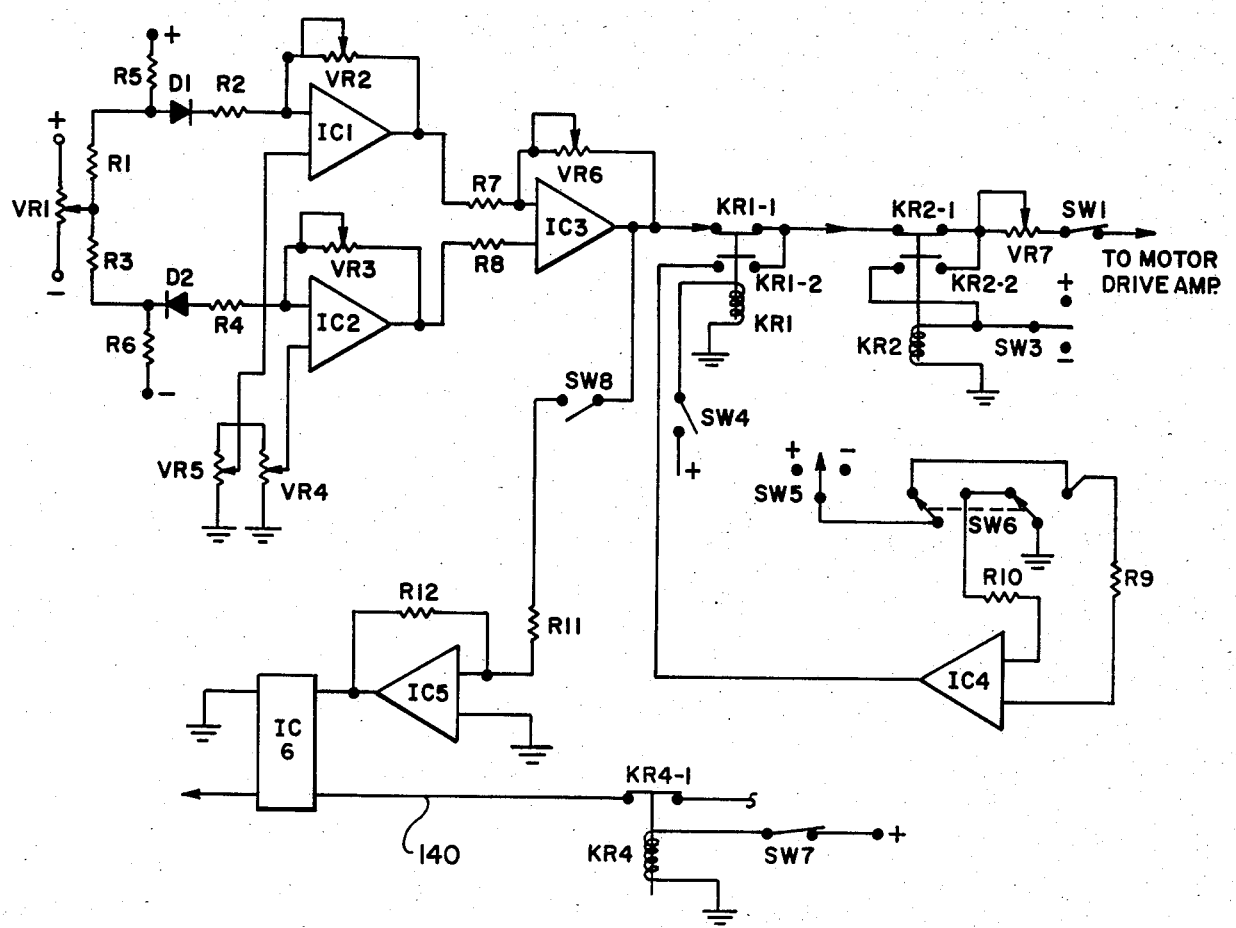

FIG. 8 is an electrical diagram of one of the potentiometers located in the stylus and its associated control circuitry. Each of the three control circuits shown in FIG. 7 has circuitry as shown in FIG. 8. Each of the potentiometers 80 and potentiometer 104 are preferably linear taper potentiometers. A positive voltage is connected to one side of the potentiometer while a negative voltage is connected to the other side. The wiper or variable terminal of the potentiometer is then set so that at normal rest position of the stylus, no voltage appears. As the stylus is moved, causing movement of the potentiometer shaft as explained above, the wiper is moved from its zero position and supplies either a positive or negative voltage. The polarity of the voltage indicates direction of movement while the value of the voltage represents the amount of movement. As indicated above, this output signal from a potentiometer can be connected directly to the control input of the appropriate motor drive amplifier and control operation of the tool in that manner.

When using the preferred control circuitry, the signal produced by a potentiometer VR1, if positive, will pass through resistor R1, diode D1, and resistor R2 to the inverting input of integrated circuit operational amplifier IC1, such as a standard MC 1485P. The gain of IC1 is set by variable resistor VR2. If the signal from potentiometer VR1 is negative, the signal passes through resistor R3, diode D2, and resistor R4 to the inverting input of integrated circuit operational amplifier IC2. The gain of IC2 is set by variable resistor VR3.

Diode D1 is maintained in a forward biased condition by a positive bias voltage applied through resistor R5 so that any positive voltage, no matter how small, which appears on the output of potentiometer VR1 will be conducted by diode D1 to IC1. Similarly, diode D2 is maintained in a forward bias condition by a negative bias voltage applied through resistor R6 so that any negative signal on the output of VR1 will be conducted by diode D2 to IC2. The valves of resistors R1, R3, R5 and R6 are chosen to limit current flow because of the bias voltage to a minimal amount and to provide sufficient bias to diodes D1 and D2 to just keep them in forward biased condition with zero output on the wiper of VR1. With this condition of the diodes, any positive signal will be passed by diode D1 but not by diode D2 while any negative signal will be passed by diode D2 but not by diode D1. The noninverting input of IC1 is connected to ground through variable resistor VR4 while the noninverting input of IC2 is connected to ground through variable resistor VR5. In this way, IC1 and IC2 act as differential amplifiers with the zero output point of IC1 and IC2 being determined by the settings of VR4 and VR5, respectively.

The output signals from IC1 and IC2 pass through resistor R7 or R8, respectively, and are connected to operational amplifier IC3 which again forms a differential amplifier whose output is a signal proportional to the difference of the signals from IC1 and IC2. The gain of IC3 is controlled by variable resistor VR6.

In operation, if a positive voltage appears on the wiper of VR1, it is applied to IC1 which then produces an output which is sent to IC3. With an output from IC1, there is not output from IC2, and IC3 produces a positive output signal. If a negative voltage appears on the wiper of VR1, it is applied to IC2 which then produces an output which is sent to IC3. With an output from IC2, there is no output from IC1, and IC3 produces a negative output signal.

The output of IC3 is the control signal from the stylus that is fed to the motor drive amplifier. This signal passes through normally closed realy contacts KR1-1 and KR2-1, variable resistor VR7, switch SW1, and then directly to the control signal input of the motor drive amplifier.

Figure 9:
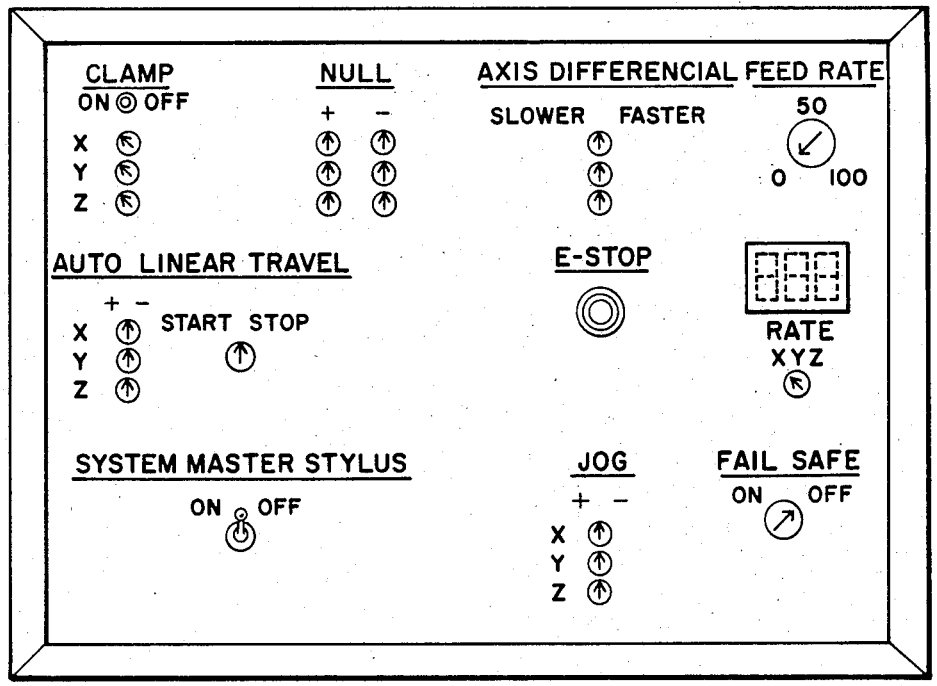

The circuitry as thus far described provides several important control features available to the operator through control panel 24. The controls for these features are shown in FIG. 9. The System Master Stylus is an on-off switch for the entire control system and may take several forms which will be obvious to one skilled in the art. For example, the System Master Stylus may be a switch which turns on and off the power supply which supplies power to all of the control circuits for the stylus. However, it would not affect the motors or motor control amplifiers so that with the stylus off, the system could still be run by computer control.

The clamp feature allows an operator to lock out movement of the machine in one or more particular planes. Since each plane has its own control circuitry, the clamping feature is provided by switch SW1 in each of the control circuits. Thus, to block out movement in a particular plane, switch SW1 is opened in the control circuit controlling movement in that plane thereby blocking any signal to the motor drive amplifier. This feature is not available with hydraulic tracer units.

The null feature allows the null point for each plane of movement of the stylus to be easily adjusted. This adjustment for the positive directions in each plane is made by variable resistor VR4 connected to IC1 and in the negative directions by variable resistor VR5 connected to IC2. The null point for the stylus is the position of the stylus in a particular plane where no signal indicating movement is provided. As long as the stylus remains at the null point, the machine will not move in that plane. As soon as the stylus moves from the null point in either direction, the machine will move accordingly. In hydraulic tracer assemblies, the null point adjustment is set by a delicate mechanical adjustment of the stylus. Further, when tracing, if the stylus reaches a null point in any direction and is against the pattern, it is impossible to cause the machine to move any further in that direction. If it is desired to be able to move the machine further in that direction, either the null point of the stylus has to be mechanically adjusted, or, in some instances, the tracing tip 120, FIG. 3, on the tracing end of stylus 32 can be changed to allow the stylus more movement in the desired direction. With the electrical adjustment of the null provided by the present invention, the null can be easily adjusted by an operator by merely turning a knob on the control panel to adjust potentiometer VR4 or VR5.

The axis differential adjustment is actually an adjustment of the rate of movement of the machine resulting from a certain displacement of the stylus in any direction. The rate of movement is controlled by the amplitude of the control signal fed to the motor drive amplifier. The amplitude of the signal resulting from a certain displacement of the stylus is easily adjusted by adjusting the amount of amplification of the signal from the stylus. This is controlled by adjusting the gain of differential amplifier IC3 which is accomplished by adjusting variable resistor VR6. The axis differential controls are the potentiometers VR6 in each of the separate control circuits. The rate differential is a very important adjustment, and again, with the hydraulic units, is a delicate mechanical adjustment. The rate adjustment is important because if the stylus is moved in a direction which represents simultaneous movement in more than one plane, the rate of movement of the machine in response to the stylus movement must be equal in each plane for equal displacement in order to accurately reproduce the angle of stylus movement. Thus, if the stylus is moved at an angle of 45° in each of two planes (representing equal movement in each of two planes) that angle will be reproduced in the part being machined only if the resulting movement of the milling implement in each plane is equal. If the rates of movement in each plane are different, an angle other than 45° will result. Similarly, if the stylus is moved at an angle of 30° in one plane, representing an angle of 60° in the other plane, that angle will be reproduced in the part only if the resulting movement of the milling implement is twice as fast in the 60° plane as in the 30° plane. For this reason, to aid in accurate setting of the rates of movement in each plane, it is preferred that the signals from the motor tachometers, in addition to being connected in normal fashion to the motor control amplifiers, be connected to a readout device such as a digital readout shown in FIGS. 7 and 9, so that an accurate reading of the rate in each direction can be made by an operator. The readout shown in FIG. 7, as well as switch SW2, are the rate readout on the control panel and the associated XYZ selector switch. Using this readout, and operating the stylus and machine without having material to be machined in position to be contacted by milling implement 12, the operator can ensure that all rates are set equally before starting to actually mill a part.

The feed rate control is actually an override control to reduce the control signals sent to the motor drive amplifier to thereby reduce the rates of movement of the machine. This control conveniently takes the form a potentiometer VR7. As the resistance of VR7 is increased, the output signal of the circuit is decreased. Since maintaining equal rates of movement in all planes of movement is important, VR7 preferably takes the form of a ganged potentiometer so that VR7 in each control circuit is operated simultaneously and to the same extent when the feed rate knob is operated.

In some instances it will be desireable to control operation of the machine tool other than by the stylus assembly. This is easily done in the system of the invention. If manual control in any one of the planes of movement is desired, three position switch SW3 is operated to connect relay winding KR2 to either a positive voltage supply or negative voltage supply. In either case, relay winding KR2 is activated to open relay contacts KR2-1 and close relay contacts KR2-2. With relay contacts KR2-1 open, any singal from the stylus is disconnected, and with contacts KR2-2 closed, either the positive signal or negative signal, depending upon the position of switch SW3, is connected through VR7 and SW1 to the motor control amplifier. This feature is called the jog and switches SW3 are the job switches on the control panel. The job switches can be operated to cause movement of the machine in any plane and direction. The rate of movement can be controlled manually by the feed rate control VR7.

With most milling machines of the type shown in FIG. 1, the machine can be set for automatic linear action in any plane by setting a switch provided for that purpose in each plane of travel and by setting associated dogs along the line of travel in each direction so that as a dog reaches a switch, the switch is mechanically moved by a dog and direction of travel is reversed. As shown in FIG. 1, a switch to control movement of the feed table is generally located within housing 130 and positioned adjacent feed table 11 so that as either dog 131 or 132 contacts the switch, movement of the feed table is reversed.

With the present invention, the automatic linear action is provided by the "Auto Linear Travel" feature shown on the control board of FIG. 9. Referring to the circuitry of FIG. 8, switch SW4 is the auto linear travel start and stop switch. Switch SW4 is provided as a triple or more pole switch so that the single switch on the control panel provides separate, but simultaneously operated, switches in each of the control circuits. When SW4 is closed, relay KR1 is energized which causes relay contacts KR1-1 to open and relay contacts KR1-2 to close. Switch SW5 provides the + or − determination shown on the control panel for each of the circuits. Here a separate switch is used in each control circuit so that the direction of automatic travel in each plane can be independently controlled. Thus, if switch SW5 is in its center off position as shown in FIG. 8, with switch SW4 closed so that relay contacts KR1-1 are open blocking any signals from the stylus, no signal is provided through relay contacts KR1-2 and the machine will not move in the particular plane controlled by the control circuit. If switch SW5 is moved to the positive position, a positive signal is sent through one pole of switch SW6 to an input of operational amplifier IC4. In the position of switch SW6 shown, the positive signal is connected through resistor R9 to the inverting input of IC4. The non-inverting input of IC4 is connected through resistor R10 and switch SW6 to ground. In this manner, IC4, which is connected as a differential amplifier, produces a positive signal which passes through relay contacts KR1-2 and KR2-1, variable resistor VR7 and switch SW1 to the motor drive amplifier to cause movement of the machine in the desired direction.

Switch SW6 is the switch mounted on the machine for actuation by the dogs. Thus, when travel in the initial direction has gone the desired distance, a dog will come in contact with switch SW6 and cause it to change position. After the position change of switch SW6, the positive signal from switch SW5 is connected through resistor R10 to the inverting input of IC4 and the non-inverting input is connected through resistor R9 to ground. With this connection, a negative signal is produced by IC4 and sent to the motor drive amplifier and the direction of movement of the machine is reversed. When the desired amount of travel in the opposite direction has been accomplished, the switch SW6 is switched back to its initial position by action of the appropriate dog and travel is again reversed. This back and forth travel continues until either switch SW4 is opened or until switch SW5 is moved to its center off position. If switch SW5 is switched to its negative position rather than its positive position to start automatic travel, the operation of the circuit and the switch SW6 is the same but the initial direction of travel is different. It should be noted that while a direction switch for initial travel is provided (the actual direction of travel when either the positive or negative position is selected being dependant also on the position of switch SW6), it is important for the operator to coordinate his initial direction of movement with the position of switch SW6 so that switch SW6 is positioned to actually change position and reverse direction of travel when contacted by the appropriate dog. If the operator selects the direction in which SW6 has already been thrown, the dog cannot change the position of SW6 and the machine will continue its motion in the same direction and will not be reversed. While the initial direction control is preferred, the switch SW6 could be provided merely as an on-off switch to connect to a fixed voltage. The switch SW6 would be set so that the direction of movement of the machine would always be in the proper direction relative to switch SW6.

The E-stop or emergency stop feature illustrated on the control panel of FIG. 9 is an emergency stop for the entire machine. A relay KR-4 is provided with normally open relay contacts KR4-1 positioned in the main power line 140 providing power to the machine. The emergency stop feature is provided by a push-pull switch SW7 which is maintained in either on an off position once manually set, which, when closed, connects relay KR4 to a source of power not controlled by relay contacts KR4-1. With switch SW7 closed, relay KR4 is energized and relay contacts KR4-1 closed to provide power to the machine and control circuits. When SW7 is opened, relay KR4 is deenergized and all power to the machine is shut off due to the opening of relay contacts KR4-1. Operatin of the machine immediately stops.

The last feature as shown on the control panel of FIG. 9 is a Fail-Safe feature which may be conveniently provided using the system of the invention. Such system is provided for the machine when it is operating under computer control as opposed to control through the tracing stylus. Currently, there is no really effective means of constantly checking a machine that is under computer control to ensure that nothing goes wrong with the control whereby the machines makes a wrong move and causes damage to the part being machined.

As described above, when in the tracing mode, the operator uses the tracing stylus to trace a pattern by moving the stylus and causing the machine to move in such a way that the stylus moves along the pattern and the machine tool moves through the material being machined to reproduce the pattern. If a pattern is placed in position as it would be for tracing, but rather than using the stylus to trace the pattern, the machine is operated under computer control and the computer has been programmed to machine a part identical to the pattern, the stylus will move with the machine along the pattern as the part is being machined. If the machine moves incorrectly so that the machine would move and cause the milling implement to cut into what would be the part, the stylus will hit the pattern and, with the fail-safe feature provided, stop opertion of the machine before damage is done to the material being machined.

As shown in FIG. 8, the fail-safe feature is provided by connecting the output of the stylus as obtained at the output of IC3, through switch SW8 and resister R11 to operational amplifer IC5 so that a small signal from IC3 is amplified to the level necessary to operate a low level optically isolated DC relay such as a Teledyne 1458 indicated as IC6. The gain of IC5 is set by feedback resistor R12. Solid state relay IC6 is connected to control main power line 140 to the machine and is normally closed so that with no signal from IC5, the relay is closed and power is supplied to the machine for normal operation. With switch SW8 closed so that the fail-safe feature is connected, if the stylus moves so that a signal is produced at the output of IC3, that signal is amplified through IC5 and a signal applied to relay IC6 to open power line 140 thereby disconnecting all power to the machine. Such operation prevents the ruining of a partially or nearly completed part by a malfunction of the machine controls or the computer. Once relay IC6 opens the main power line, it will keep the line open until the relay is reset.

The power supply for the control circuitry can be any type of supply which provides both a positive and negative voltage, preferably +15 and −15 volts, as well as a common ground. The supply may conveniently take the form of a well-known center tap transformer with appropriate rectifiers so that the center tap becomes the ground for the circuit. Since such power supply circuitry is well known in the art, it is not illustrated here.

It should be noted that when the machine tool with which the stylus is used is also connected to a computer for computer control, the computer position indicators located on the movable portions of the machine must be unlocked so that they are free to move as the parts of the machine are moved under stylus or other control. If the position indicators are not unlocked and thus not free to be moved, they will be torn from the machine as the machines moves under other control.

Another feature and advantage of the current invention when used with a machine which is connected to a computer for computer control is that the machine can be controlled using the stylus to trace a pattern, and with the computer position indicators unlocked, but connected to supply position information to the computer as the machines moves, program the movements of the machine tool into the computer so that additional parts can be made by the machine by computer control. This is a much easier and less expensive way of programming a machine tool than the usual programming of the controlling computer. It is particularly useful for small runs of replacement parts where an actual part can be used as a pattern, or other small runs where a pattern for the part is available.

While the invention has been described in relation to a machine and stylus which moves in three planes, the invention can be used with machines with operate in only two dimensions, or with machines which operate in more than three dimensions. Further, while potentiometers have been shown as the means to generate the electrical signals which are proportional to the movement of the stylus, various other means could be used to sense movement, such as magnetic or inductive sensing means.

Also, as is evident from the above disclosure of the fail-safe feature of the invention, a method of monitoring operation of a computer-controlled machine tool to ensure that the control does not malfunction and cause the machine to damage a part being machined is disclosed. This method includes the steps of securing a tracing stylus assembly as described to a machine tool as described and securing a pattern of the part to be machined to the machine in similar relationship to the tracing stylus as the material to be machined is positioned in relation to the milling implement. The tracing stylus assembly is then connected to means for halting operation of the machine if a signal is received from the tracing stylus indicating that the machine is moving into the part rather than about its periphery. Such movement, if continued, would ruin the part being machined.

Whereas this invention is here illustrated and described with specific reference to a embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A tracing stylus assembly for controlling the operation of an electrically controlled machine tool, comprising a housing adapted to be mounted on a machine tool; a stylus member mounted in said housing, one end of which extends from the housing and is adapted to be held by a user and manipulated to trace a pattern, the stylus member being movable in said housing in transverse planes which correspond to the transverse planes of relative movement between the material being machined and the machining implement; means for converting the movement of the stylus member in each plane into electrical signals representative of the amount and direction of movement of the stylus in each plane, such signals being a separate voltage signal for each plane of movement with the polarity of the signal indicating the direction of movement in such plane and the amplitude of the signal indicating the amount of movement; a first differential amplifier for each plane of movement connected to receive the signals from the stylus representing movement of the stylus in one direction in that plane and to produce an output representative of a difference between that input and a first reference signal; a second differential amplifier for each plane of movement connected to receive the signals from the stylus representing movement of the stylus in the opposite direction in that plane and to produce an output representative of the difference between that input and a second reference signal; and a third differential amplifier for each plane of movement connected to produce a signal representative of the difference in the outputs of the first and second differential amplifiers, the output signal from the third differential amplifier being the signal representative of the movement of the stylus in either direction in that plane from its adjusted zero position, adjustment of at least one of the reference signals adjusting the zero output position of the stylus in that plane.

2. A tracing stylus assembly according to claim 1, wherein respective voltage signals representing stylus movement can vary between +10 and −10 volts.

3. A tracing stylus assembly according to claim 1, wherein the stylus member is pivotally mounted in the housing so that it is free to move in two transverse planes about its pivot point.

4. A tracing stylus assembly according to claim 3, wherein the means for converting the movement of the stylus member in the two transverse planes of movement about its pivot point into electrical signals includes two longitudinal movement members coupled to the stylus and arranged at right angles to one another for back and forth longitudinal movement in the two transverse planes of stylus movement.

5. A tracing stylus assembly according to claim 4, wherein each longitudinal movement member is coupled to an associated potentiometer so that as the member moves longitudinally, the setting of the associated potentiometer is changed.

6. A tracing stylus assembly according to claim 5, wherein a positive voltage is connected to one end of the potentiometer, a negative voltage is connected to the other end of the potentiometer, and the wiper of the potentiometer produces the output signal representative of the position of the longitudial movement member which is representative of the movement of the stylus in that plane.

7. A tracing stylus assembly according to claim 3, wherein the pivot point of the stylus is adapted to move along with the stylus in a third plane of movement transverse to the two planes in which the stylus can move about its pivot point.

8. A tracing stylus assembly according to claim 7, wherein the means for converting the movement of the stylus in the third plane of movement into electrical signals includes a third longitudinal movement member coupled to the stylus for back and forth longitudinal movement in response to movement of the stylus in the third plane of movement.

9. A tracing stylus assembly according to claim 8, wherein the third longitudial movement member is coupled to a potentiometer so that as the member moves longitudinally, the setting of the potentiometer is changed.

10. A tracing stylus assembly according to claim 1, wherein the gain of the third differential amplifier is adjustable so that the magnitude of the output signal for any particular difference in input signals can be adjusted separately for each plane of movement of the stylus.

11. A tracing stylus assembly according to claim 10, wherein the third differential amplifier is an intergrated circuit operational amplifier and the gain is adjusted by adjusting the value of a feedback resistance connected between the output of the amplifier and the inverting input of the amplifier.

12. A tracing stylus assembly according to claim 10, wherein the output of the third differential amplifier passes through a variable resistance before being supplied to the machine tool as a control signal therefor, such variable resistance providing further adjustment of the amplitude of the control signal connecting to the machine tool.

13. A tracing stylus assembly according to claim 12, wherein the variable resistance in the output of the third differential amplifier for each electrical signal representing movement of the stylus in a particular plane, is a similar potentiometer ganged together so as to be controlled similarly and simultaneously for each signal.

14. A tracing stylus assembly according to claim 1, wherein the assembly additonally includes separate means for each electrical signal representing movement of the stylus in a particular plane for electrically adjusting the amplitude of the signal connected to the machine tool which represents a particular displacement of the stylus in that plane.

15. A tracing stylus assembly according to claim 14, wherein means are provided to visually indicate to a user the amplitude of each signal representing a particular displacement of the stylus in a particular plane to thereby enable the user to adjust the separate signals so that an equal displacement of the stylus in any plane produces a signal of equal amplitude representing displacement of the stylus in that plane.

16. A tracing stylus assembly according to claim 15, wherein the means to visually indicate the amplitude of a signal includes a tachometer attached to an electrical motor in the machine tool controlled by a particular control signal and a visual readout which produces a readout proportional to the operation of the motor.

17. A tracing stylus assembly according to claim 1, wherein the assembly additionally includes means for a user to manually generate a signal without moving the stylus to cause movement of the machine tool in a desired direction in a desired plane.

18. A tracing stylus assembly according to claim 1, wherein the assembly additionally includes at least one switch for placement on the machine tool in a position to be contacted by and switched by a set of dogs mounted on a movable portion of the machine tool so that automatic back and forth movement of the machine tool is effected by such switch as it is switched to a position to reverse the direction of travel by a dog which controls the switch at the desired limit of travel in each direction.

19. A method of monitoring operation of a computer controlled machine tool to ensure that the control does not malfunction and cause the machine to damage a part being machined, comprising the steps of securing a tracing stylus assembly which produces an electrical output upon movement of a stylus member to the machine tool so that the tracing stylus will move similarly to the milling implement in the machine tool; securing a pattern of the part to be machined to the machine tool in similar relationship to the tracing stylus as the material to be machined is positioned in relation to the milling implement; electrically connecting the electrical output of the tracing stylus assembly to means for halting operation of the machine tool; and operating the machine tool, whereby if the operation of the tool is proper, the stylus member merely moves about the pattern immediately adjacent thereto but if the tool moves in a manner that would damage the part being machined, the stylus member abuts and is moved by the pattern to create an output which halts operation of the machine tool.

20. A control system for halting operation of a machine tool operating under automatic or manual control if the tool moves in a manner to ruin a part being machined and wherein the machine tool includes a machining implement, comprising a housing adapted to be mounted on the machine tool; a stylus member mounted in said housing, one end of which extends from the housing and is adapted to be held in similar relation to a pattern for the part to be machined as the machining implement is in relation to the material to be machined, the stylus member being movable in said housing in transverse planes which correspond to the transverse planes of relative movement between the material being machined and the machining implement; means for converting the movement of the stylus member in each plane into electrical signals; and means electrically connected to the means for converting movement of the stylus into electrical signals for halting operation of the machine tool upon receipt of an electrical signal representative of movement of the stylus member.

21. A control system according to claim 20, wherein the means for halting operation of the machine tool includes a relay positioned to disconnect all operating power to the machine upon receipt of a signal representative of movement of the stylus member.

* * * * *